(12) United States Patent
Ramnarayanan et al.

(10) Patent No.: US 10,417,203 B2
(45) Date of Patent: Sep. 17, 2019

(54) COMPACTING DATA HISTORY FILES

(71) Applicant: Pivotal Software, Inc., San Francisco, CA (US)

(72) Inventors: Jagannathan Ramnarayanan, Portland, OR (US); Ashvin Agrawal, Cupertino, CA (US); Anthony M. Baker, Sherwood, OR (US); Daniel Allen Smith, Portland, OR (US); Hemant Bhanawat, Maharashtra (IN); Swapnil Prakash Bawaskar, Hillsboro, OR (US)

(73) Assignee: Pivotal Software, Inc., San Francisco, CA (US)

( * ) Notice: Subject to any disclaimer, the term of this patent is extended or adjusted under 35 U.S.C. 154(b) by 222 days.

(21) Appl. No.: 15/422,818

(22) Filed: Feb. 2, 2017

(65) Prior Publication Data
US 2017/0147616 A1   May 25, 2017

Related U.S. Application Data

(62) Division of application No. 14/526,366, filed on Oct. 28, 2014, now Pat. No. 9,582,527.
(Continued)

(51) Int. Cl.
*G06F 16/21* (2019.01)
*G06F 16/17* (2019.01)
(Continued)

(52) U.S. Cl.
CPC ............ *G06F 16/219* (2019.01); *G06F 16/17* (2019.01); *G06F 16/1744* (2019.01);
(Continued)

(58) Field of Classification Search
None
See application file for complete search history.

(56) References Cited

U.S. PATENT DOCUMENTS 5,890,154 A    3/1999  Hsiao et al.
6,721,749 B1   4/2004  Najm et al.
(Continued)

OTHER PUBLICATIONS

International Search Report and Written Opinion in International Application No. PCT/US2014/062730, dated Apr. 15, 2015, 15 pages.
(Continued)

*Primary Examiner* — Wilson Lee
(74) *Attorney, Agent, or Firm* — Fish & Richardson P.C.

(57) ABSTRACT

Methods, systems, and apparatus for obtaining one or more metadata files, determining, by one or more computers and in accordance with a minor compaction setting, to perform a minor compaction of the one or more metadata files, creating one or more intermediate metadata files that each include at least compacted contacts of one or more of the metadata files, according to the determination to perform minor compaction of the one or more metadata files, determining, in accordance with a major compaction setting, to perform a major compaction of one or more of the intermediate metadata files, and creating one or more snapshot metadata files that each include at least compacted contents of one or more of the intermediate metadata files, according to the determination to perform the major compaction of one or more of the intermediate metadata files.

26 Claims, 6 Drawing Sheets

Related U.S. Application Data

(60) Provisional application No. 61/896,644, filed on Oct. 28, 2013.

(51) Int. Cl.
*G06F 16/215* (2019.01)
*G06F 16/27* (2019.01)
*G06F 16/174* (2019.01)
*G06F 16/23* (2019.01)

(52) U.S. Cl.
CPC ........ *G06F 16/215* (2019.01); *G06F 16/2322* (2019.01); *G06F 16/2358* (2019.01); *G06F 16/273* (2019.01)

(56) References Cited

U.S. PATENT DOCUMENTS

| | | | |
|---|---|---|---|
| 8,756,197 | B1 | 6/2014 | Wilde et al. |
| 9,582,527 | B2 * | 2/2017 | Ramnarayanan ............ G06F 17/30129 |
| 2006/0179058 | A1 * | 8/2006 | Bram .............. G06F 21/121 |
| 2009/0077136 | A1 | 3/2009 | Igawa et al. |
| 2010/0023805 | A1 | 1/2010 | Colaiacomo et al. |
| 2010/0088522 | A1 | 4/2010 | Barrus et al. |
| 2011/0246503 | A1 | 10/2011 | Bender et al. |
| 2011/0295804 | A1 | 12/2011 | Erofeev et al. |
| 2012/0233463 | A1 * | 9/2012 | Holt ............... G06F 17/30575 713/168 |
| 2012/0297181 | A1 | 11/2012 | Lee |
| 2013/0104251 | A1 * | 4/2013 | Moore .............. G06F 21/602 726/30 |
| 2014/0129519 | A1 | 5/2014 | Leshchiner et al. |
| 2014/0173135 | A1 | 6/2014 | Varney et al. |

OTHER PUBLICATIONS

"Amazon S3," Oct. 11, 2013 (Oct. 17, 2013), XP055178365, Retrieved from the Internet: URL:http://en.wikipedia.org/w/index.php?title=Amazon_S3&oldi d=577552788 [retrieved on Mar. 23, 2015] 7 pages.

Dean, "Dealing with Hadoop's small files problem," May 30, 2013 (May 30, 2013), XP055174761, Retrieved from the Internet: URL:http://snowplowanalytics.com/blog/2013/05/30/dealing-with-hadoops-small-files-problem/ [retrieved on Mar. 9, 2015] 8 pages.

Khandelwal, "Developer(s) Apache Software Foundation Operating system Cross-platform Type Distributed File System License Apache License 2.0," Oct. 25, 2013 (Oct. 25, 2013), XP055174762, Retrieved from the Internet: URL:http://en.wikipedia.org/w/index.php?title=Apache_Hadoop&oldid=578665526 [retrieved on Mar. 9, 2015] 18 pages.

White, "The Small Files Problem," Feb. 2, 2009 (Feb. 2, 2009). XP055175072, Retrieved from the Internet: URL:http://blog.cloudera.com/blog/2009/02/the-small-files-problem/ [retrieved on Mar. 10, 2015] 5 pages.

International Preliminary Report on Patentability in International Application No. PCT/US2014/062730, dated May 12, 2016, 11 pages.

* cited by examiner

COMPACTING DATA HISTORY FILES

CROSS-REFERENCE TO RELATED APPLICATIONS

This application is a divisional of U.S. patent application Ser. No. 14/526,366, filed Oct. 28, 2014 (now U.S. Pat. No. 9,582,527), which claims the benefit of U.S. Provisional Patent Application Ser. No. 61/896,644, filed Oct. 28, 2013. The contents of the foregoing applications are hereby incorporated by reference in their entirety.

TECHNICAL FIELD

The specification relates to cloud computing, and to log file processing.

BACKGROUND

A cloud computing system can store data by distributing the data to a system of multiple computers connected by one or more communications networks. At least some of the data stored by the cloud computing system can include data files. The cloud computing system can also store log files that record operations performed on the stored data files.

SUMMARY

A parallel processing database system receives data and requests to modify the data. The system maintains a queue, e.g., an asynchronous queue, that is updated to include requests to perform operations on the data. The data is distributed on each of multiple computers of the parallel processing database system. A history of operations modifying the data is stored on each computer of the parallel processing database system in multiple operation log files. The parallel processing database system compacts the operation log files periodically to create larger, but fewer, merged operation log files. During compaction, the parallel processing database system discards various amount of history based on a compaction setting. The compaction setting can specify that the compaction is a minor compaction or a major compaction. In a minor compaction, at least some past values of each data record are preserved. In a major compaction, only the latest value of each data record is preserved.

The system can generate a new metadata file with each flush of the queue. Each metadata file generated as a result of flushing the queue includes requested operations identified by the queue at the time of the queue flush. For example, a newly created metadata file will identify requested events that are included in a previous metadata file generated as a result of a previous queue flush, in addition to events that have been requested since the previous queue flush. The system performs minor compaction on a set of metadata files to merge the metadata files into an intermediate, larger metadata file. By combining the metadata files into the intermediate metadata file, the system can optimize reads from the metadata when determining requested operations to perform. Major compaction is performed to combine intermediate metadata files into larger snapshot metadata files. The major compaction operation stores the snapshot metadata files such that the snapshot metadata files contain the most up to date information regarding the requested operations. A user of the system, e.g., a system administrator, can control queue flushes and metadata file compaction and storage performed by the system. For example, the user can specify parameters controlling performance of queue flushes and metadata file compaction and storage. For example, users of the system can indicate the frequency with which the queue is flushed, parameters associated with performing minor and major compaction, and the amount of data compacted or maximum metadata file sizes.

The details of one or more embodiments of the subject matter described in this specification are set forth in the accompanying drawings and the description below. Other features, aspects, and advantages of the subject matter will become apparent from the description, the drawings, and the claims.

DESCRIPTION OF THE DRAWINGS

Like reference symbols in the various drawings indicate like elements.

DETAILED DESCRIPTION

This specification describes a system that stores user-provided data by distributing the data across memory nodes. The system maintains a queue, e.g., an asynchronous queue, that is updated to include requests, e.g., queries of the data stored by the system, requests to perform transactions with respect to data stored by the system, requests to synchronize data with external data storage units, or requests to perform other operations. The system can flush the queue and can include information from the flushed queue in metadata files that specify the requests, e.g., that specify keys used in performing the requests. To optimize reading of these metadata files, the system compacts metadata files to create intermediate metadata files and snapshot metadata files. The system can access data associated with these metadata files to determine operations to perform on data stored by the system. In some implementations, the compaction of metadata files data can be controlled by users of the system. For instance, users can determine when minor and major compaction processes are performed, can determine an amount of data to include in metadata files, and can set other parameters relevant to performing queue flushes and metadata storage.

Figure 1:
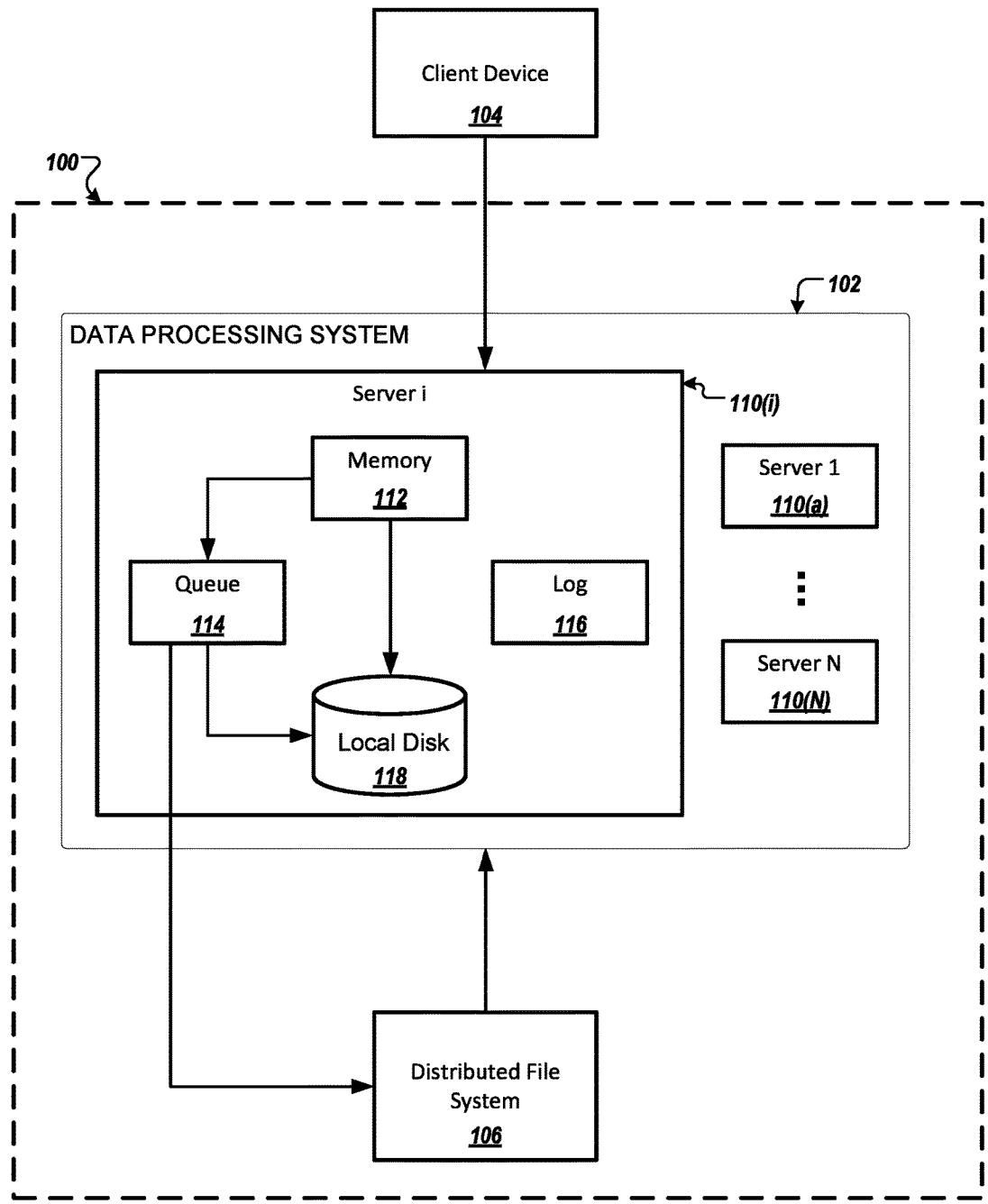
FIG. 1 illustrates an example system for storing data.

FIG. 1 is a block diagram of an example system 100 for storing data in a distributed parallel processing database system. The system 100 is a memory-optimized, distributed data store configured to perform online transaction processing (OLTP) tasks including, for example, database query processing and data modeling. The system 100 includes a data processing system 102 for in-memory storage and processing of operational data, and a distributed file system 106 for data persistence and scalability. Data persistence includes storing non-operational data on disk. Scalability is an ability of the system 100 to store large volume of data including multiple large files, e.g., files the size of which reaches several terabytes. An example of the distributed file system 106 is the Hadoop™ Distributed File System (HDFS™). ("Hadoop" and "HDFS" are trademarks of the Apache Software Foundation.)

The data processing system 102 includes multiple members. The members are connected to each other through a communications network, e.g., a wide area network (WAN), in a peer-to-peer (P2P) topology. Each peer member maintains persistent communication channels to every other peer member in the data processing system 102. Each member includes a server having one or more processors, memory, and one or more disks local to the server. Each server can execute a Java virtual machine ("JVM"), in which data operations are performed. In the example system shown, the members of the data processing system 102 include a first server 110(a), an i-th server 110(i), through an N-th server 110(N). The data processing system 102 can distribute a large database table having multiple data records for storage on the first server 110(a), i-th server 110(i), through N-th server 110(N) by partitioning the database table into logical buckets. Each bucket is a container for data and is associated with one or more servers for storing and processing the data in the container.

The data processing system 102 partitions the database table into the buckets according to a partition strategy associated with the database table, for example, as specified in a "PARTITION BY" clause in a "CREATE TABLE" statement. A data record in the database table can be distributed to one of the buckets based on the partition strategy, e.g., by hashing a primary key in the data record. Each logical bucket can be assigned to one or more of the first server 110(a), i-th server 110(i), through N-th server 110(N). Each of the first server 110(a), i-th server 110(i), through N-th server 110(N) can store a mapping between all clusters and all servers, including which server stores which bucket.

The data processing system 102 is configured to receive a data update request from a 104. The data update request can include a structured query language (SQL) statement, or a SQL-like statement, for inserting, deleting, or updating multiple rows of data in a databases table that is distributed among the first server 110(a), i-th server 110(i), through N-th server 110(N). The data update request can be replicated among the first server 110(a), i-th server 110(i), through N-th server 110(N). On each server, e.g., the server 110(i), the data update request is stored in a queue 114. The queue 114 can store multiple requests that, each in turn, cause data on the portion of the database table distributed to the server 110(i) to be updated.

The update can occur in memory 112, e.g., when the data being updated is designated as operational data. The data can be designated as operational data by a user, for example, using a data definition language (DDL) extension statement specifying a condition. Additionally or alternatively, the update can occur in the distributed file system 106. For example, when the server 110(i) ingests a large amount of data, e.g., when the data does not fit into the memory 112, the data can be streamed to the distributed file system 106. In addition, operational data can be evicted from memory and stored in the distributed file system 106.

The server 110(i) maintains operation logs ("logs") 116. The operation logs 116 are used by the server 110(i) to record a history of updates on each database table or on each data record, based on a log setting. The operation logs 116 can be persisted by the server 110(i) to the local disk 118 or the distributed file system 106 as log files according to the log setting. The operation logs 116 are compacted by the server 110(i) or another component of the system 100, e.g., the distribute file system 106, according to a compaction strategy. For example, a compaction strategy can specify that obsolete operations be removed from a log file when the size of the log file reaches a threshold, e.g., one gigabyte (1 GB). The log setting and compaction strategy can be specified by a user in a configuration file.

Figure 2:
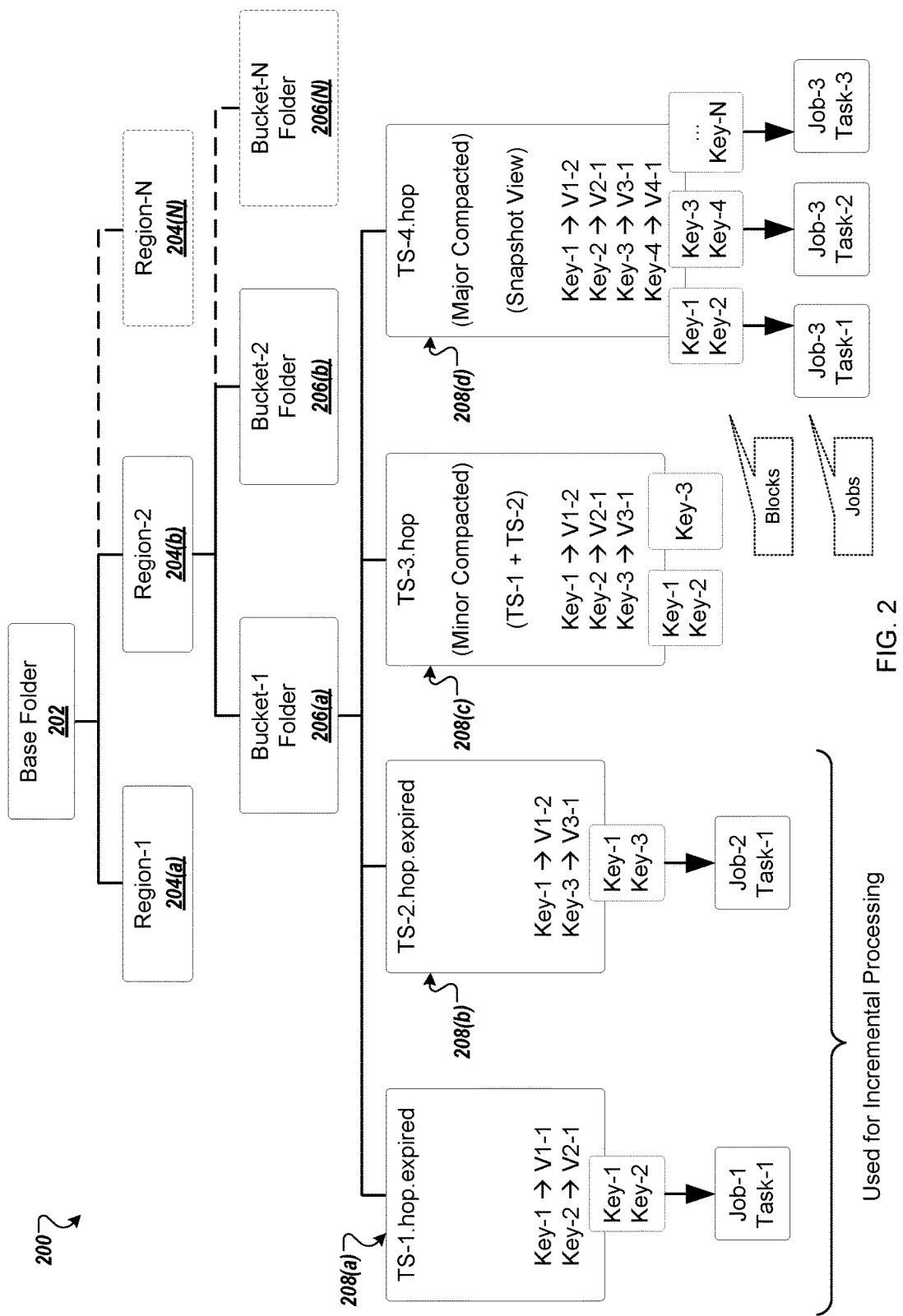
FIG. 2 illustrates an example system for compacting data history files.

FIG. 2 illustrates an example system 200 for compacting data history files. For example, the system 200 can be used in conjunction with, or as a portion of, the system 100 used to compact metadata or other log files associated with a queue of the system 100. As described with reference to FIG. 1, the system 100 can be a data storage system, such as a distributed data storage system. A queue associated with a storage system, such as the system 100, can be flushed to create temporary metadata files. Temporary metadata files can undergo minor compaction to create intermediate metadata files. Intermediate metadata files can then be compacted to create snapshot metadata files.

Briefly, the system 200 can include, at various times, a base folder 202, region folders 204(a)-204(b), bucket folders 206(a)-206(b), and metadata files 208(a)-208(d). The base folder 202 can be a virtual container of files or directories in a distributed file system, e.g., HDFS. In some implementations, the system 200 receives and/or provides data to components of the system 100, such as by receiving data from the queue 114 of the data processing system 102, over one or more networks, or over one or more other wired or wireless connections.

The metadata files 208(a)-208(d) can be generated and stored in bucket folders 206(a)-206(b), where the bucket folders are maintained as a part of a region folder 204(a)-204(b). The region folders 204(a)-204(b) are maintained as folders within the larger base folder 202, where the base folder 202 can be maintained at the distributed file system 106 of the system 100. In some implementations, the system 200 can be integrated with other components of the system 100, such as the log 116, local disk 118, memory 112, or queue 114 of the server 110(i), or of other servers 110(a)-110(N). The metadata files 208(a)-208(d) store information generated as a result of performing a flush of a queue 114 associated with the system 100, such as an asynchronous queue 114 that logs event requests associated with the system 100.

The metadata files 208(a) and 208(b) are temporary metadata files that can be generated as a result of a flush of the queue 114 associated with the system 100. For instance, based on the system 100 determining to perform a flush of the queue 114, data can be transmitted to the distributed file system 106 that identifies events that are included in the queue 114, as well as information associated with the events that are included in the queue 114. Information associated with requested events include, for example, data identifying timestamps associated with requested events that are included in the queue 114, e.g., data that identifies a date and time when an event was requested, data identifying event types associated with the items of the queue 114, e.g., data indicating whether a request is a request to query data, perform a transaction on data, or synchronize data with an external data repository, data identifying keys that provide a serializable representation of a primary key that is associated with a row of a data structure associated with data that is stored by the system 100, and other relevant information, e.g., data identifying properties of the stored data.

Each flush of the queue 114 associated with the system 100 results in the creation of a new temporary metadata file such that the temporary metadata file includes all event requests that precede the flush of the queue 114. For example, at a time $T_1$, the system 100 may perform a flush of the queue 114 that results in the creation of the temporary metadata file 208(a), where the temporary metadata file 208(a) is assigned the file name TS-1.hop. The temporary metadata file 208(a) created in response to the queue flush performed at time $T_1$ may include data identifying all event requests received prior to time $T_1$ that are included in the queue at the time $T_1$, for example, all user-input requests received prior to the time $T_1$ to perform queries, transactions, or synchronizations of data stored by the system 100. At a subsequent time $T_2$, the system 100 may perform another flush of the queue 114 that results in the creation of the temporary metadata file 208(b), where the temporary metadata file 208(b) is assigned the file name TS-2.hop. The temporary metadata file 208(b) created in response to the queue flush performed at time $T_2$ may include data identifying all event requests received prior to time $T_2$, specifically, those event requests received prior to time $T_1$ as well as those event requests received between time $T_1$ and time $T_2$. For instances in which a portion of the event requests included in the queue 114 at time $T_1$ are no longer identified by the queue at time $T_2$, the temporary metadata file 208(b) may include only those event requests that are identified by the queue at time $T_2$.

Each of the temporary metadata files 208(a), 208(b) include information identifying event requests included in the queue 114 at the time of the flush. For example, the temporary metadata file 208(a) includes information identifying key/value pairs, where the key/value pairs are associated with particular versions of the key/value pairs, e.g., may be associated with a particular value associated with a particular key. As used, a key may identify a particular set of data stored by the system 100, and a value may identify the content of the data associated with the key, an action to perform with respect to the data identified by the key, etc.

For example, the temporary metadata file 208(a), assigned the file name TS-1.hop, may include entries associated with event requests, such as the entries "Key-1→V1-1" and "Key-2→V2-1." As such, "Key-1→V1-1" refers to a first key, and a first version of a value associated with the first key, while "Key-2→V2-1" refers to a second key, and a first version of a value associated with the second key. Similarly, the temporary metadata file 208(b), assigned the file name TS-2.hop, includes the entry "Key-1→V1-2" referring to the first key and a second version of the value associated with the first key, and the entry "Key-3→V3-1" referencing a third key and a first version of a value associated with the third key. In some instances, a value associated with a key may change based on additional event requests provided with respect to data associated with a particular key. In some instances, the keys identified by the temporary metadata file 208(a), 208 (b) are ordered by key, e.g., such that lower numbered keys appear before later numbered keys. Ordering keys included in a temporary metadata file may enable efficient key lookup when processing the requested events included in the temporary metadata file. In other implementations, keys identified in a temporary metadata file 208(a), 208(b) can be ordered in another way, or can be included in the temporary metadata file 208(a), 208(b) as a set of unsorted keys, e.g., in no particular order.

In some instances, queue flushes are performed periodically, such as every five minutes, or based on the passage of another predetermined period of time. In some instances, the periodicity with which queue flushes are performed is defined by users of the system 100, e.g., users that have provided data to the system 100, can be defined by moderators of the system 100, e.g., operators of a service associated with the system 100, or can be defined by the system 100, e.g., as a predetermined time period. In some implementations, a queue flush is performed based on detecting particular conditions or events relating to the system 100, or in response to detecting particular conditions or events associated with the queue 114 of the system 100. For instance, a queue flush may be performed based on determining that the system 100 has performed a certain number of operations associated with requested events, based on determining that a certain number of event requests have been added to the queue 114 or that a certain number of event requests are included in the queue 114, based on detecting an amount of data that is being transmitted to and/or from one or more client devices 104 to the data processing system 102, or an amount of data that is being transmitted to and/or from the data processing system 102 to the distributed file system 106, or based on detecting any other condition or event relating to the system 100, e.g., based on a file size associated with the queue 114 and/or one or more components of the system 200. In some implementations, conditions associated with performing queue flushes are set by users of the system 100, moderators of the system 100, or other entities, e.g., automatically by the system 100.

Two or more temporary metadata files 208(a), 208(b) can undergo minor compaction. Compacted data from the two or more temporary metadata files 208(a), 208(b) can be included in an intermediate metadata file 208(c). For example, based on determining that two temporary metadata files 208(a), 208(b) assigned the file names TS-1.hop and TS-2.hop have been created as a result of queue flushes performed at the system 100, the system can create an intermediate metadata file 208(c) and assign the file name TS-3.hop to the intermediate metadata file 208(c). The contents of the temporary metadata files 208(a), 208(b) can be subjected to minor compaction, and data stored in the intermediate metadata file 208(c) can include the information of the temporary metadata files 208(a), 208(b) after the information stored in the temporary metadata files 208(a), 208(b) has undergone minor compaction.

For example, the intermediate metadata file 208(c), which has been assigned the file name TS-3.hop, includes the entries "Key-1→V1-2," "Key-2→V2-1," and "Key-3→V3-1." As with the temporary metadata files 208(a), 208(b), the intermediate metadata file 208(c) can sort the keys included in the file, e.g., according to ascending order of key value. Sorting the key included in a temporary metadata file 208(c) can enable more efficient parsing and/or reading from the temporary metadata file 208(c). In instances in which more than one version of a particular key exists, e.g., in which "Key-1→V1-1" and "Key-1→V1-2" exist, the intermediate metadata file 208(c) includes only the most recent version of the key, e.g., "Key-1→V1-2." In some implementations, the intermediate metadata file 208(c) can include more than one version of the key, e.g., both "Key-1→V1-1" and "Key-1→V1-2."

Based on the temporary metadata files 208(a), 208(b) being compacted in the intermediate metadata file 208(c), the temporary metadata files 208(a), 208(b) can be marked as eligible for deletion. For example, based on the temporary metadata files 208(a), 208(b) being compacted, the temporary metadata files 208(a), 208(b) can be renamed, e.g., from TS-1.hop to TS-1.hop.expired and from TS-2.hop to TS-2.hop.expired.

While the temporary metadata files 208(a), 208(b) may be marked as eligible for deletion based on the completion of the minor compacting, the temporary metadata files 208(a), 208(b) are not removed based on the completion of the minor compacting. As the temporary metadata files 208(a), 208(*b*) are not deleted in response to the minor compaction, the temporary metadata files 208(*a*), 208(*b*) may continue to be accessed by the system 100, for example, to enable the system to perform events requested and identified in the temporary metadata files 208(*a*), 208(*b*).

The intermediate metadata file 208(*c*) created in connection with performing minor compaction of the temporary metadata files 208(*a*), 208(*b*) can retain tombstones. Such tombstones may be retained to signify that data associated with the data contained in the temporary metadata files 208(*a*), 208(*b*) has potentially expired, been modified, or is no longer stored at the same location, and therefore helps avoid potential data corruption at the system 100. In some implementations, tombstone entries included in the intermediate metadata file 208(*c*) may include or identify expired temporary metadata files, such as expired versions of the temporary metadata files 208(*a*), 208(*b*) that have been assigned the file names TS-1.hop.expired and TS-2.hop.expired.

Major compaction can be performed on intermediate metadata files. Information from the compacted intermediate metadata files can be included in a snapshot metadata file that includes information from the intermediate metadata files of a bucket. For example, major compaction can be performed on the intermediate metadata file 208(*c*) and other intermediate metadata files included in the bucket-1 folder 206(*a*), and the snapshot metadata file 208(*d*) can be created such that the snapshot metadata file 208(*d*) includes the compacted contents of the one or more intermediate metadata files.

As shown, the snapshot metadata file 208(*d*) is assigned the file name TS-4.hop, where the snapshot metadata file 208(*d*) can include information stored in the intermediate metadata files. For example, the snapshot metadata file 208(*d*) includes the entries, "Key-1→V1-2," "Key-2→V2-1," "Key-3→V3-1," and "Key-4→V4-1." As shown, the entries corresponding to "Key-1," "Key-2," and "Key-3" are associated with the entries of the intermediate metadata file 208(*c*) TS-3.hop, and the entry corresponding to "Key-4" may correspond to an entry included in another intermediate metadata file (not shown). As described with respect to both temporary metadata files 208(*a*), 208(*b*), and intermediate metadata files 208(*c*), keys identified in a snapshot metadata file 208(*d*) are sorted according to the key value or other characteristics of the key, e.g., a date when it was last modified, or may be included in the snapshot metadata file 208(*d*) as unsorted keys. Sorting keys included in the snapshot metadata file 208(*d*) can, in some implementations, enable for more efficient parsing and/or reading from the snapshot metadata file 208(*d*).

The data included in the snapshot metadata file 208(*d*) can include information that identifies various keys, and the snapshot metadata file 208(*d*) can identify a single value associated with each key. In some implementations, the value associated with each key and included in the snapshot metadata file 208(*d*) can be the last known or most recent value of the key, as determined from the metadata files of the bucket. For example, based on the temporary metadata file 208(*a*) identifying a first value associated with the key "Key-1," e.g., "Key-1→V1-1" and the temporary metadata file 208(*b*) identifying a second value associated with the key "Key-1," e.g., "Key-1→V1-2," the snapshot metadata file 208(*d*) can identify the latest known value to associate with "Key-1" such that the snapshot metadata file 208(*d*) includes data identifying the latest value, e.g., "Key-1→V1-2."

The major compaction process that results in the snapshot metadata file 208(*d*) may further result in the removal of tombstone entries. For example, based on major compaction being performed on one or more intermediate metadata files, such as the intermediate metadata file 208(*c*), tombstones included in the intermediate metadata files can be removed.

As described thus far, compaction can be performed with respect to metadata files that are associated with read/write data configurations. In other implementations, data may be streamed to the distributed file system 106 of FIG. 1, or to another component of the system 100 that is associated with the system 200, e.g., the log 116, local disk 118, memory 112, or queue 114 of a server 110(*i*).

In some implementations in which a data streaming configuration is used, temporary metadata files are not compacted. Rather, a temporary metadata file created as a result of a queue flush is succeeded by new temporary metadata files that are created in response to subsequent flushes of the queue 114. For instance, a first flush of the queue 114 may result in the creation of a first temporary metadata file that includes the requested events identified in the queue 114. A second flush of the queue 114 can then result in the creation of a second temporary metadata file that includes the requested events identified in the queue 114, such that the information in the second temporary metadata file has been updated based on operations performed by the system 100 since the last queue flush. For example, a first temporary metadata file can include an entry for a key "Key-1→V1-1," and a second temporary metadata file may include an entry for the key "K-1→V1-2." As the system 100 is processing the data included in the temporary metadata files, the system 100 may be unaware that the same key, e.g., "Key-1," is associated with more than one value, e.g. "V1-1" and "V1-2," such that the system 100 may process the key without determining that the key is included on another node, or without determining that the key has been processed on the same node previously. Additionally, keys included in temporary metadata files may be unsorted in streaming data applications, unlike the read/write applications in which the keys are ordered to facilitate key lookup.

The system 100 can perform incremental processing on metadata files to perform requested events, e.g., operations that have been requested by one or more users of the system 100. In the implementations described, metadata files, e.g., the temporary metadata files 208(*a*), 208(*b*), the intermediate metadata files 208(*c*), and the snapshot metadata files 208(*d*), can include all requested events up through a particular time associated with the queue. Metadata files and requested events identified in metadata files can be associated with timestamps. Based on a user of the system 100 identifying a particular timestamp, all metadata files associated with timestamps prior to the user-identified timestamp can be ignored or otherwise bypassed by the system 100, and all metadata files associated with timestamps more recent than the user-identified timestamp can be identified and selected for processing. For example, a set of three metadata files may be associated with timestamps $T_1$, $T_2$, and $T_3$. Based on a user identifying a timestamp U, such that U is later than $T_1$, but earlier than both $T_2$ and $T_3$, the metadata files associated with the timestamps $T_2$ and $T_3$ can be selected for processing. In some instances, processing the data included in a metadata file can include identifying data associated with a key that is identified in the metadata file, and performing a requested operation on the identified data, e.g., by querying the data, performing a transaction on the data, or synchronizing the data with an external data repository.

Conflation is disabled such that a single key identified in a particular metadata file is only associated with a single key value. In some instances, metadata files may store versions of key value that are outdated, e.g., values that have been replaced or otherwise updated in subsequent metadata files. In such instances, outdated versions of a key value may be removed during a compaction phase, such as during minor compaction or major compaction. For example, the temporary metadata files 208(a) and 208(b) both contain key values associated with "Key-1," such that the key/value pair "Key-1→V1-2" is a more current key/value pair than "Key-1→V1-1." Thus, during compaction, the value "V1-1" may be removed such that only the key/value pair "Key-1→V1-2" remains. In some implementations, a "checkpoint view" that allows users to view information associated with data stored by the system 100 may be accessible by one or more users of the system 100, and the "checkpoint view" may only display the value associated with a key that has been retained by major compaction, e.g., the key/value pair "Key-1→V1-2."

Compaction of metadata files can be performed based on settings and/or parameters defined by users of the system 100. For example, a user may define a periodicity with which minor and/or major compaction can occur, e.g., every five minutes or once per day. In other implementations, minor and/or major compaction can be determined based on a minimum and/or maximum metadata file size that may be used for compaction. For example, a user may specify a maximum metadata file size, where determining that a metadata file will exceed the maximum size can result in minor compaction being performed on the metadata file and one or more other temporary metadata files to create an intermediate metadata file. In other implementations, a total metadata file size to achieve prior to performing compaction may be identified, and minor and/or major compaction can be performed based on determining that the total metadata file size has been exceeded or is close to being exceeded. For example, a user may specify a total metadata file size, and based on determining that multiple temporary metadata files cumulatively satisfy the total metadata file size, minor compaction can be performed on the temporary metadata files and one or more intermediate metadata files may be created. In some implementations, users of the system 100 can indicate whether minor or major compaction is performed by the system 100, for example, such that the system 100 may perform minor compaction of temporary metadata files, while forgoing major compaction of intermediate metadata files.

As described, metadata files that are created as a result of queue flushes, e.g., temporary metadata files 208(a), 208(b), and/or metadata files that are created as a result of compaction, e.g., 208(c), can be marked for deletion. For instance, temporary metadata files 208(a), 208(b) may be marked for deletion after minor compaction is performed, and the intermediate metadata files 208(c) or snapshot metadata files 208(d) can be marked for deletion after major compaction, after a threshold period of time has passed, or after all of the requested events identified in the metadata files have been performed by the system 100. Thus, a large number of expired metadata files, e.g., those metadata files that have been marked for deleted, may exist, such that deletion of the expired metadata files may be required or desirable. In some implementations, an expired metadata file can be deleted after the passing of a threshold period of time, e.g., 12 hours after it is marked as expired, or metadata files can be deleted periodically regardless of how long a particular metadata file has been expired, e.g., every 12 hours. In some implementations, the period of time with which expired metadata files can be removed from the distributed file system 106 can be configured by a user of the system 100, by a moderator of the system 100, or based on other criteria, e.g., based on the system 100 determining that it should remove one or more expired metadata files. In some implementations, expired metadata files can be deleted based on other conditions or operations, e.g., can be manually deleted by users of the system, can be deleted in response to determining a total size of expired metadata files stored at the distributed file system 106, or can be deleted based on detecting other conditions.

In some implementations, metadata files may be of a size that is greater than a threshold size, and the distributed file system 106 can store the metadata file in one or more blocks, such as one or more blocks associated with an HDFS system. For instance, the distributed file system 106 may divide data into blocks of a particular size, e.g., 64 megabytes (MB), and based on a metadata file being larger than the particular size, the metadata file can be divided and stored on two or more blocks. As an example, the data contained in the intermediate metadata file 208(c) can be of a size that exceeds a block size, e.g., a block size can be 64 MB, while the size of the intermediate metadata file 208(c) may be 100 MB. Based on determining that the size of the intermediate metadata file 208(c) is greater than the block size, the data associated with the intermediate metadata file 208(c) can be stored in two blocks, e.g., a first block storing data associated with "Key-1" and "Key-2," and a second block storing data associated with "Key-3." Blocks can then be incrementally processed in parallel and independently, e.g., such that a single processing node will be unaware of the jobs being processed on other nodes.

Figure 3:
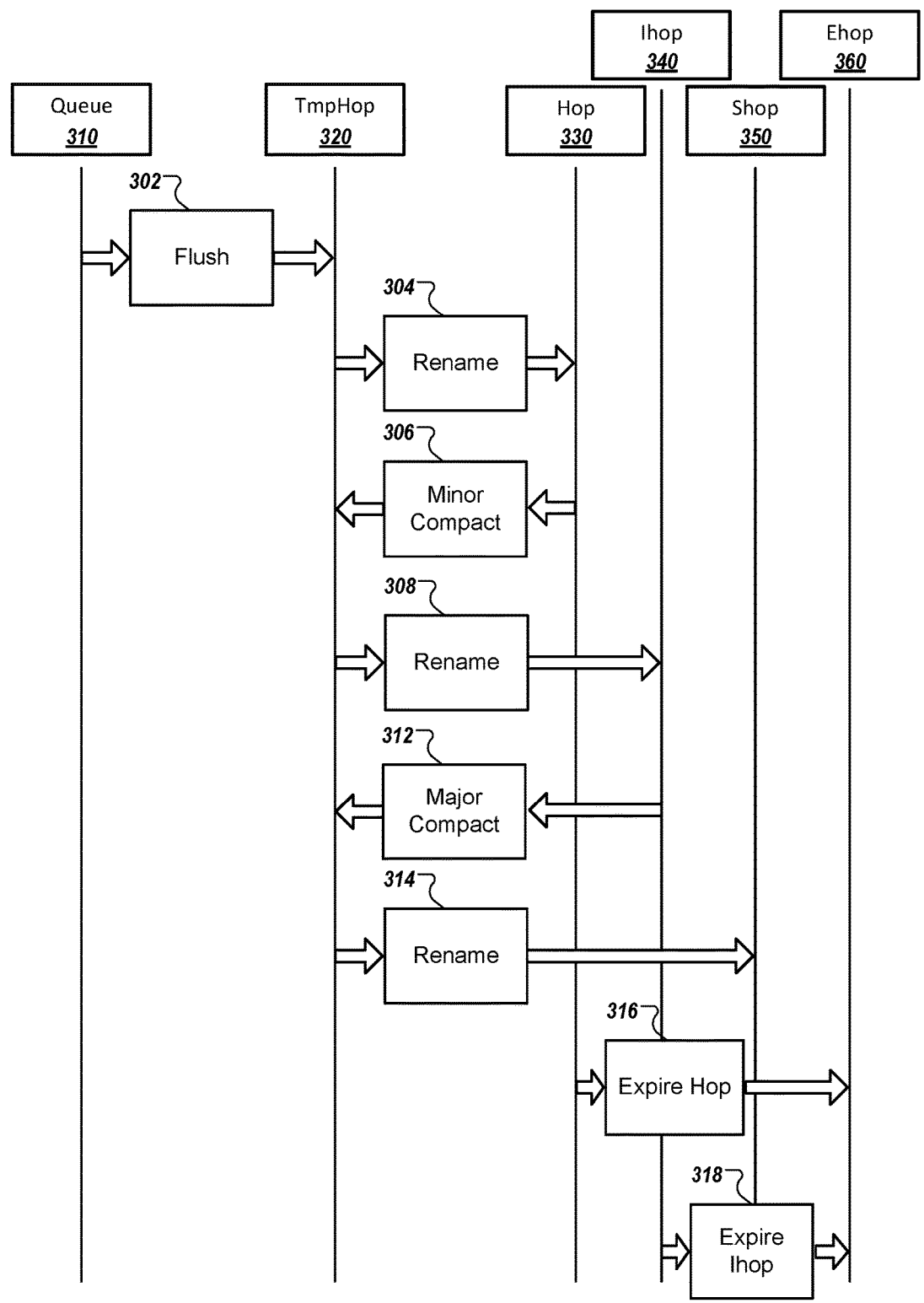
FIG. 3 illustrates an example process for compacting data history files.

FIG. 3 depicts an example process 300 for compacting data history files. For example, the process 300 is performed by the system 100 in response to one or more queue flush operations being performed at the queue 114 of the system 100. In some implementations, the process 300 can be performed at the distributed file system 106 of the system 100, or at another component of the system 100.

Briefly, the process 300 involves a queue 310, such as a synchronous or asynchronous queue, and files TmpHop 320, Hop 330, Ihop 340, Shop 350, and Ehop 360. The files TmpHop 320, Hop 330, Ihop 340, Shop 350, and Ehop 360 can be stored and modified at the distributed file system 106 or at another component of the system 100.

To flush and compact data history files, the processing system 100 flushes (302) the queue 310, and the system 100 stores data associated with the queue 310 in the file TmpHop 320. For instance, the queue 310 can include data that identifies event requests provided by users of the system 100, and a flush operation can be performed on the queue 310. When the queue is flushed, data identifying the event requests provided by the users of the system 100 are stored in the file TmpHop 320.

The processing system creates the file Hop 330 and stores the data identifying the event requests provided by the users of the system 100 in the file Hop 330. To do this, the processing system can, for example, rename (304) the file TmpHop 320 to create the file Hop 330. For example, the file TmpHop 320 can be a temporary file, and the processing system can rename the file TmpHop 320 that includes the data received from the queue 310 as the file Hop 330 and store the file Hop 330 in the distributed file system 106. In some implementations, the file Hop 330 may be similar to the temporary metadata files 208(a), 208(b) described with reference to FIG. 2.

The processing system performs (306) minor compaction of the file Hop 330. For example, the file Hop 330 may undergo minor compaction as described with reference to FIG. 2, such that information included in the file Hop 330 and information included in one or more files similar to the file Hop 330, e.g., one or more other temporary metadata files, is compacted and included in a single temporary metadata file. The processing system stores information that has undergone minor compaction, including the information contained in the file Hop 330, in the file TmpHop 320. In some implementations, the file TmpHop 320 that stores data following minor compaction may be the same file that received the flush data from the queue 310 at step 302, or may be a different file TmpHop 320. In some implementations, the processing system performs minor compaction as a result of determining that a threshold period of time has passed, based on determining that a file size of one or more metadata files such as the file Hop 330 or metadata files similar to the file Hop 330 are of a certain file size, based on determining that a total file size of all metadata files similar to the file Hop 330 exceed a certain cumulative file size, or based on determining that other conditions associated with performing minor compaction have been met or that other events associated with performing minor compaction have been detected.

The processing system creates the file Ihop 340 and stores the result of the minor compaction in the file Ihop 340. In some implementations, the system performs this by renaming (308) the file created as a result of performing minor compaction to create the file Ihop 340. For example, minor compaction may result in the storage of queue flush data in the file TmpHop 320, where the file TmpHop 320 is maintained as a temporary file, or is created as a result of performing minor compaction, and the processing system renames the file TmpHop 320 that includes the data resulting from the minor compaction and stores the renamed file at the distributed file system as the file Ihop 340. In some implementations, the file Ihop 340 may be similar to the intermediate metadata file 208(c) described with respect to FIG. 2.

The processing system performs (312) major compaction of the file Ihop 340. For example, the file Ihop 340 can undergo major compaction as described with reference to FIG. 2, such that information included in the file Ihop 340 and information included in one or more other files similar to the file Ihop 340, e.g., one or more other intermediate metadata files, is compacted and included in a single file. The processing system stores information that has undergone major compaction, including the information stored in the file Ihop 340, in the file TmpHop 320. In some implementations, the file TmpHop 320 that stores the compacted data may be the same file that received the flush data from the queue 310 and/or the file that received the data following minor compaction. In other implementations, the file TmpHop 320 that stores the compacted data may be a different file TmpHop 320, e.g., a different file with similar properties as the files created and/or used for data storage in association with perform the queue flush and minor compaction. In some implementations, major compaction is performed as a result of determining that a threshold period of time has passed, based on determining that a file size of one or more metadata files, such as the file Ihop 340 or files similar to the file Ihop 340, are of a certain file size, based on determining that a cumulative file size of all metadata files similar to the file Ihop 340 are of a certain file size, or based on determining that other conditions associated with performing major compaction are met or that other events associated with performing major compaction are detected.

The processing system creates the file Shop 350 and stores the result of performing major compaction in the file Shop 350. In some implementations, for example, the processing system renames (314) the file created as a result of performing major compaction to create the file Shop 350. For example, the processing system can store data resulting from performing major compaction of queue flush data in the file TmpHop 320, where the file TmpHop 320 is maintained as a temporary file, or is a file created by the processing system in response to performing major compaction. The processing system can rename the file TmpHop 320 and store the file at the distributed file system as the file Shop 350. In some implementations, the file Shop 350 is similar to the snapshot metadata file 208(d) described with respect to FIG. 2.

The processing system marks (316) the file Hop 330 as expired. For example, based on performing major compaction of the file Ihop 340 to create the file Shop 350, the processing system can mark the file Hop 330 as expired. Subsequently, files marked as expired may be removed, e.g., by deleting the expired file Hop 330 from the distributed file system 106. In some implementations, marking a file Hop 330 as expired can include changing the file name of the file Hop 330, e.g., from the file name TS-1.hop to TS-1.hop.expired. The processing system can determine that a file with an '.expired' file name is an expired file, and can subsequently remove the file (not shown). In some implementations, marking a file as expired can involve creating a new file, e.g., the file Ehop 360, such that the processing system can remove the file Hop 330 from the distributed file system 106. In other implementations, the processing system can rename the existing file Hop 330, e.g., by renaming the file Hop 330 to the file Ehop 360, such that the file Hop 330 is no longer recognized by the processing system.

The processing system marks (318) the file Ihop 340 as expired. For example, based on performing major compaction of the file Ihop 340 to create the file Shop 350, the file Ihop 340 is marked as an expired file. Subsequently, files marked as expired, including the expired file Ihop 340, are removed from the system, e.g., by deleting the expired file Ihop 340 from the distributed file system 106. In some implementations, the processing systems marks a file Ihop 340 as expired by changing the file name of the file Ihop 340, e.g., from the file name TS-3.hop to TS-3.hop.expired. The processing system can determine that the metadata file has been marked as expired, and can subsequently remove the file (not shown). In some implementations, marking a file as expired can involve creating a new file, e.g., the file Ehop 360, such that the file Ihop 340 is removed from the distributed file system 106, or can involve renaming the existing file Ihop 340, e.g., by renaming the file Ihop 340 to the file Ehop 360, such that the file Ihop 340 is no longer recognized by the system 100. In some implementations, the expired file Hop 330 at step 316 and the expired file Ihop 340 created at step 318 can be the same file, or can be different files. For example, the file Ehop 360 may be a file that includes contents of one or more expired files, such that the file Ehop 360 includes the contents of the expired file Hop 330 and the expired file Ihop 340. In another example, a first file Ehop 360 may be created that relates to the expired file Hop 330, and a second file Ehop 360 may be created that relates to the expired file Ihop 340.

Figure 4:
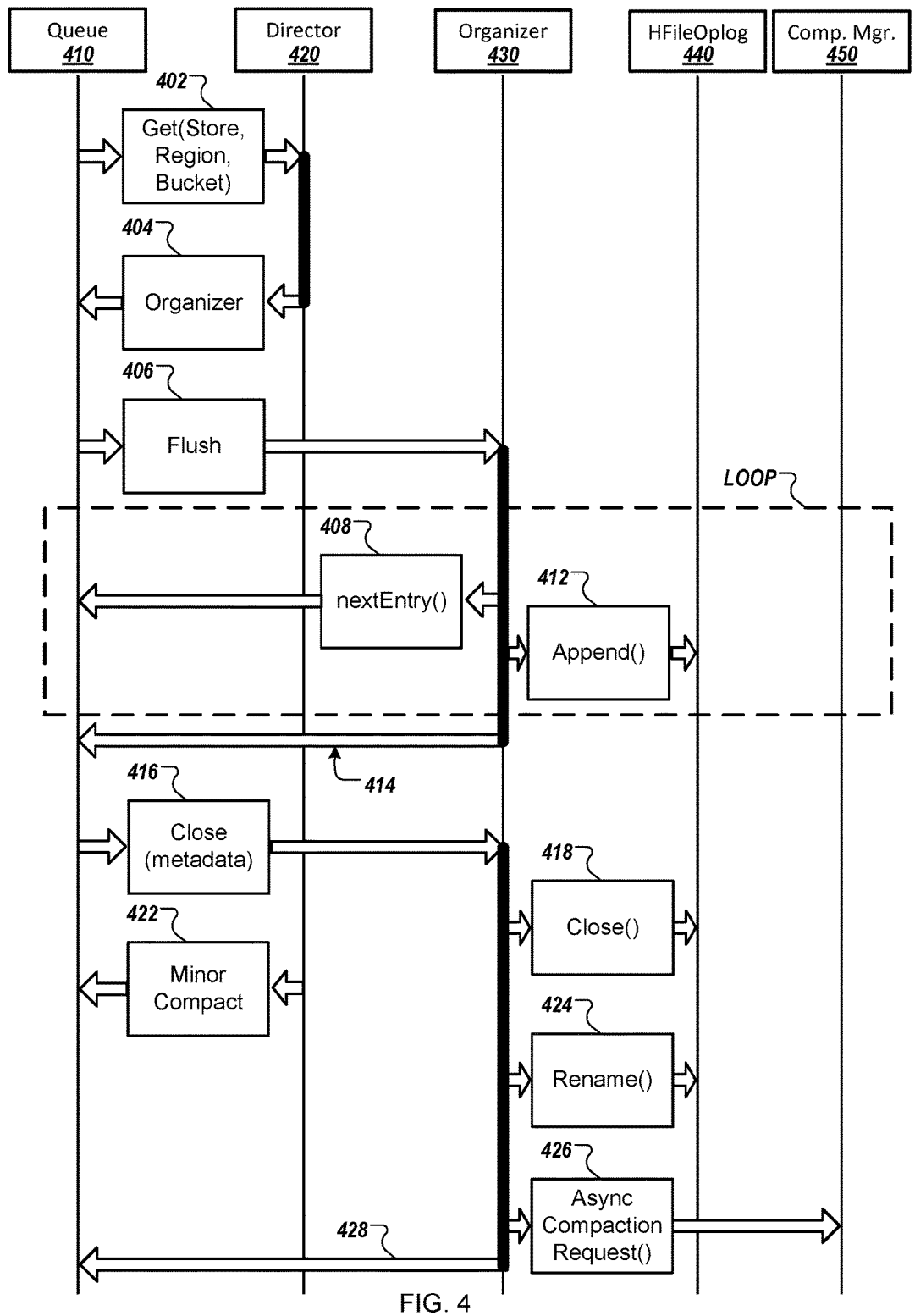
FIG. 4 illustrates an example process for creating data history files.

FIG. 4 depicts an example process 400 for creating data history files. For example, the process 300 can be performed by the system 100 when performing a queue flush operation, such as the queue flush described with reference to FIG. 2 and FIG. 3. In some implementations, the process 400 can be performed at the distributed file system 106 of the system 100, or at another component of the system 100.

Briefly, the process 400 can include accessing data at a queue 410, such as a synchronous or asynchronous queue, and can be performed by or otherwise involve a director 420, an organizer 430, an HFileOplog 440, and a compaction manager 450. The director 420, organizer 430, HFileOplog 440, and compaction manager 450 may each be included in the distributed file system 106 of the system 100, or can be a part of another component of the system 100.

The director 420 receives (402) information that identifies a data store, region, and bucket. For example, the director 420 can receive data from the queue 410 that identifies a particular data store associated with the system 100, e.g., that identifies a particular server 110(i) of the one or more servers 110(a)-110(N) associated with the data processing system 102, data that identifies a particular region folder, e.g., the region folder 204(b) of the one or more region folders 204(a)-204(N), and that identifies a particular bucket, e.g., the bucket folder 206(a) of the bucket folders 206(a)-206(N) included in the system 200. In some implementations, the director 420 receives the information identifying the data store, region, and bucket based on determining that one or more conditions associated with performing a queue flush have been satisfied, e.g., based on determining that a threshold period of time has passed, or based on determining that a number of requested events included in the queue 410 exceeds or is close to exceeding a predetermined number of requested events.

The director 420 transmits (404) data to the queue 410 that identifies the organizer 430. For example, the director 420 can receive information identifying a data store, a particular region, and a bucket, and in response to receiving the information can transmit data to the queue 410 that identifies the organizer 430. In some implementations, the data identifying the organizer 430 is data that indicates that the queue 410 should perform a queue flush operation, such that the queue 410 transmits information included in the queue 410 to the organizer 430. In some instances, the organizer 430 can be an organizer 430 that is specific to the specific store, region, and/or bucket identified by the queue 410.

A flush of the queue 410 is initiated (406) and data from the queue 410 is transmitted to the organizer 430. For example, the queue 410 receives data from the director 420 that causes data from the queue 410 to be flushed and transmitted to the organized 430. In some implementations, performing or initiating a flush operation can involve transmitting data from the queue 410 to the organizer 430, where the transmitted data identifies requested events that are included in the queue 410. In some implementations, flushing of the queue 410 be performed in response to receiving the data from the director 420, can be initiated by the director 420 that is in communication with the queue 410, or can be initiated by the organizer 430 that receives the data from the queue 410.

The organizer 430 receives (408, 412) information from the queue 410 and appends the information received from the queue 410 to a metadata file by transmitting data to the HFileOplog 440. For example, the organizer 430 receives data that identifies a requested event from the queue 410, and the organizer 430 transmits data to the HFileOplog 440 that causes the data identifying the requested event to be appended to a metadata file stored at the HFileOplog 440. Based on transmitting the data identifying the requested event to the HFileOplog 440, the organizer 430 can transmit data to the queue 410, where the transmitted data can request the next operation request entry included in the queue 410. The organizer 430 receives data associated with the next operation request entry, and transmits data to the HFileOplog 440 that causes the data associated with the entry to be appended to the metadata file stored at the HFileOplog 440. The processing system repeats the process for each entry in the queue 410, or alternatively for a subset of the entries in the queue 410, until the metadata file associated with the HFileOplog 440 includes all, or the subset, of the requested operations that are identified in the queue 410. In some implementations, the HFileOplog 440 stores the information obtained from the queue 410, or can otherwise be associated with the obtained information, e.g., by having access to over one or more networks, or over one or more wired or wireless connections, to a metadata file that includes the information obtained from the queue 410. In some implementations, the metadata file associated with the HFileOplog 440 can be a temporary metadata file, such as the temporary metadata files 208(a), 208(b) of FIG. 2.

The organizer 430 determines (414) that the entries of the queue 410 have been appended to the metadata file associated with the HFileOplog 440, and transmits data to the queue 410 indicating that the HFileOplog 440 has received the necessary data from the queue 410.

In response to determining that the entries of the queue 410 have been appended to the metadata file associated with the HFileOplog 440, the queue 410 transmits (416) data to the organizer 430 indicating that the metadata file associated with the HFileOplog 440 can be closed. For example, based on the queue 410 transmitting data to the organizer 430 that identifies all of the event requests included in the queue 410, queue 410 can transmit a message to the organizer 430 that indicates that there are no further entries of the queue 410 to include in the metadata file stored by the HFileOplog 440.

In response to receiving the data that indicates that the metadata file associated with the HFileOplog 440 can be closed, the organizer 430 transmits (418) data to the HFileOplog 440 that causes the metadata file associated with the HFileOplog 440 to be closed. For example, based on receiving data from the queue 410 indicating that the metadata file associated with the HFileOplog 440 can be closed, the organizer 430 can transmit data to the HFileOplog 440 that causes the metadata file associated with the HFileOplog 440 to be closed.

The director 420 transmits (422) data to the queue 410 to initiate a minor compaction operation. For example, the director 420 can determine that a minor compaction of one or more metadata files stored by or otherwise associated with the HFileOplog 440 should be compacted, e.g., based on a threshold amount of time having passed, based on determining that a file size of one or more metadata files associated with the HFileOplog 440 are of a certain file size, based on determining that a total file size of all metadata files associated with the HFileOplog 440 are cumulatively of a certain file size, or based on determining that other conditions associated with performing minor compaction have been met or that other events associated with performing minor compaction have been detected. As described, the time parameters, conditions, or events associated with performing minor compaction can be assigned by a user of the system 100, e.g., a user associated with the client device 104.

The organizer 430 transmits (424) data to the HFileOplog 440 that renames the metadata file associated with the HFileOplog 440. For example, based on determining that minor compaction should be performed on one or more metadata files associated with the HFileOplog 440, a message is transmitted to the HFileOplog 440 that causes the metadata file associated with the HFileOplog 440 to be renamed. For example, the data transmitted by the organizer 430 and associated with renaming the metadata file can cause the metadata file to be identified as an expired metadata file, e.g., by renaming the file TS-1.hop to TS-1.hop-.expired, and/or can cause the metadata file to be renamed such that it is identified as a different metadata file, e.g., an intermediate metadata file.

The organizer 430 transmits (426) data to the compaction manager 450, where the transmitted data requests compaction of the information included in the metadata file associated with the HFileOplog 440. For example, based on determining that the director 420 has requested minor compaction of the metadata file associated with the HFileOplog 440, the organizer 430 can transmit data to the compaction manager 450 that requests minor compaction of the metadata file associated with the HFileOplog 440. In some implementations, the data transmitted to the compaction manager 450 causes the compaction manager 450 to perform compaction of the metadata file associated with the HFileOplog 440, causes the compaction manager 450 to evaluate whether the metadata file and/or other metadata files associated with the HFileOplog 440 can or should be compacted, e.g., based on evaluating one or more conditions associated with compacting metadata files, or can cause the processing system to perform other operations associated with compacting metadata files that are associated with the HFileOplog 440.

The organizer 430 provides (428) data to the queue 410 that indicates that the process of creating, closing, renaming, and/or compacting the metadata file associated with the HFileOplog 440 has been completed. For example, the organizer 430 can transmit data to the queue 410 that indicates that the organizer 430 has requested compaction of the metadata file associated with the HFileOplog 440, and/or can transmit data to the queue 410 that identifies the updated name of the metadata file associated with the HFileOplog 440.

Figure 5:
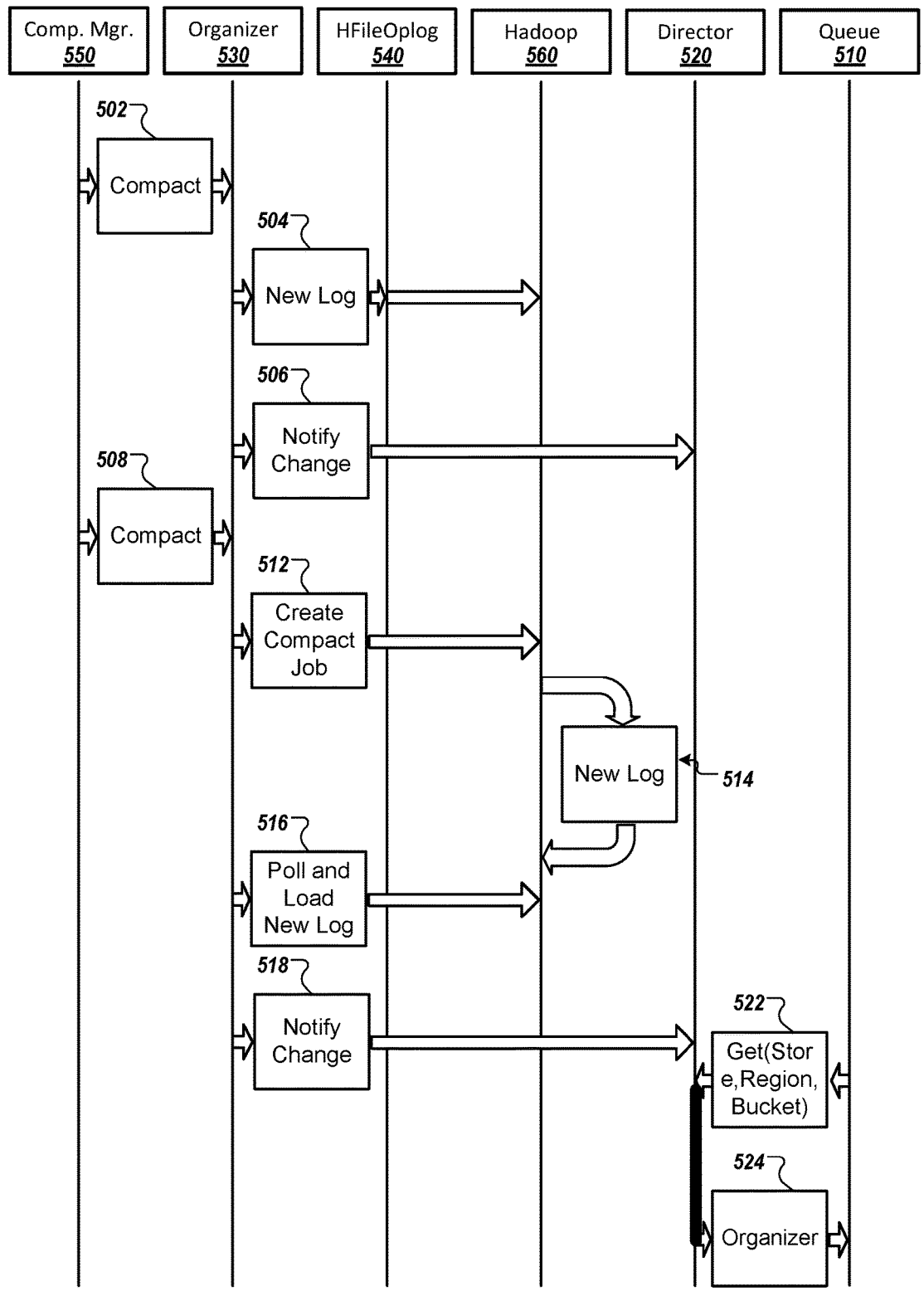
FIG. 5 illustrates an example process for compacting data history files.

FIG. 5 depicts an example process 500 for compacting data history files. For example, the processing system 100 performs the process 500 when the system 100 determines that one or more conditions associated with performing compaction of metadata files are satisfied, based on receiving commands or messages to compact metadata files, e.g., from a user of the system 100, and/or based on a component of the system 100 initiating a metadata compaction operation, e.g., based on the organizer 430 of FIG. 4 transmitting data to the compaction manager 450 to request compaction at step 426 of FIG. 4.

Briefly, the process 500 can be performed by and/or involve a compaction manager 550, an organizer 530, an HFileOplog 540, a file system 560, a director 520, and a queue 510. The compaction manager 550, organizer 530, HFileOplog 540, file system 560, and director 520 can each be included in the distributed file system 106 of the system 100, or can be a part of another component of the system 100. In some implementations, the compaction manager 550, organizer 530, HFileOplog 540, director 520, and queue 510 can correspond to the compaction manager 450, organizer 430, HFileOplog 440, director 420, and queue 410 described in reference to FIG. 4, respectively.

The compaction manager 550 transmits (502) data to the organizer 530 to initialize the compaction of one or more metadata files. For example, the compaction manager 550 can transmit data that initializes the minor compaction of one or more metadata files, e.g. one or more temporary metadata files, and/or the major compaction of one or more metadata files, e.g., one or more intermediate metadata files, and the organizer 530 can receive the data. In some implementations, the compaction manager 550 can transmit the data initializing compaction based on receiving data from one or more components of the system 100 to perform compaction of one or more metadata files, such as by transmitting the data initializing the compaction based on receiving a compaction request from the organizer 530 to perform a minor or major compaction. In other implementations, the compaction manager 550 can determine to transmit the data initializing the compaction based on detecting other events, for example, based on determining that one or more conditions associated with performing compaction of metadata files are satisfied.

The organizer 530 transmits (504) data to the HFileOplog 540 and the file system 560 that causes the file system 560 to initialize the creation of a new log, such as a new metadata file. For example, based on receiving data from the compaction manager 550 that initializes a minor or major compaction, the organizer 530 transmits data to the HFileOplog 540 and the file system 560 that causes the file system 560 to initialize the creation of a new metadata file. In response to receiving the data from the organizer 530, the HFileOplog 540 and/or file system 560 can initialize the creation of a new metadata file. For instance, the HFileOplog 540 and/or file system 560 can initialize the creation of a new intermediate metadata file or a new snapshot metadata file, depending on the type of compaction being performed, e.g., depending on whether the compaction initialized by the compaction manager 550 is a minor or major compaction process. In some instances, initializing the creation of a new metadata file can include portioning data storage at the distributed file system 106 to store the new metadata file, or can involve other operations related to initializing the creation of a new metadata file.

The organizer 530 transmits (506) data to the director 520 that notifies the director 520 that a compaction process has been initialized, and thus that the creation of a new metadata file has been initialized. Based on receiving the information from the organizer 530, the director 520 may, in some implementations, store or update data associated with the director 520, such as data that identifies metadata files associated with the system 100 and that are stored at the distributed file system 106.

The compaction manager 550 transmits (508) data to the organizer 530 to initialize compaction and/or perform compaction of one or more metadata files. For example, the compaction manager 550 can transmit data to the organizer 530 that indicates a type of compaction to be performed, e.g., minor or major compaction, such that the organizer 530 receives the information and performs operations to cause the processing system to perform the compaction.

As a part of performing the compaction, the organizer 530 transmits (512) data to the file system 560 to cause the file system 560 to create a new compaction job. For example, based on receiving data from the compaction manager 550 that causes the organizer 530 that causes the processing system to perform a minor or major compaction, the organizer 530 can transmit information to the file system 560 that creates or causes a new compaction job to be created, e.g., by the file system 560. In some instances, data transmitted by the organizer 530 to the file system 560 can identify a type of compaction to perform, e.g., minor or major compaction, can identify one or more metadata files to include in the compaction process, and/or can identify other information associated with performing compaction, e.g., a file name to associate with the metadata file created when performing the compaction job.

The processing system creates (514) a new log, such as a new metadata file, at the file system 560. For example, based on receiving the data creating the compaction job at step 512, the file system 560 performs operations to create a new metadata file. In some implementations, the metadata file created by the file system 560 is the destination for information compacted from one or more other metadata files. For instance, based on a new compaction job being a minor compaction of the temporary metadata files 208(a), 208(b), the file system 560 creates a new intermediate metadata file that stores information compacted from the temporary metadata files 208(a), 208(b). In some instances, the file system 560 creates a new metadata file according to information received from the organizer 530, such as information received from the organizer 530 to create a new log or to create a new compaction job. For example, the created metadata file may have a specific file name specified by the organizer 530 or may be of a specific file type specified by the organizer 530.

The organizer 530 transmits (516) data to the file system 560 that loads the new log. For example, the data transmitted to the file system 560 causes the processing system to compact data associated with one or more metadata files and store the compacted data in the metadata file created by the file system 560. For example, based on the file system 560 creating a new metadata file at step 514, e.g., a new intermediate metadata file or snapshot metadata file, the organizer 530 can transmit data to the file system 560 that causes compacted data from one or more metadata files to be stored at the new metadata file. In some implementations, the organizer 530 performs the compaction, and can transmit the compacted data to the file system 560. In other implementations, the organizer 530 transmits the data associated with the one or more metadata files that is to be compacted to the file system 560, such that the file system 560 can complete the compaction process and store the compacted data at the newly created metadata file. In other implementations, the file system 560 and/or the organizer 530 poll the data included in the one or more metadata files undergoing compaction, and perform compaction and storage of the compacted data included in the one or more metadata files in the newly created metadata file based on polling the data included in the one or more metadata files.

The organizer 530 transmits (518) data to the director 520 that indicates that the compaction process has been completed and that a new metadata file that includes compacted queue flush data is stored on the file system 560. For example, based on determining that all of the data included in the metadata files undergoing compaction has been compacted and stored at the newly created metadata file at the file system 560, the organizer 530 can transmit data to the director 520 that indicates that the compaction process has been completed and that the newly created metadata file stored at the file system 560 includes compacted data from the queue 510 that identifies operations requested by one or more users of the system 100.

The director 520 receives (522) data from the queue 510 that identifies a data store, region folder, and bucket. For example, the director 520 can receive data from the queue 510 that identifies a particular data store associated with the system 100, e.g., that identifies a particular server 110(i) of the one or servers 110(a)-110(N) associated with the data processing system 102, data that identifies a particular region folder, e.g., the region folder 204(b) of the one or more region folders 204(a)-204(N), and that identifies a particular bucket, e.g., the bucket folder 206(a) of the bucket folders 206(a)-206(N). In some implementations, the director 520 receives the information identifying the data store, region, and bucket based on the file system 560 storing the compacted data at the newly created metadata file. For example, the queue 510 can transmit the data identifying the data store, region, and bucket to the director 520 to inform the director 520 of the location where the newly created metadata file is stored on the distributed file system, e.g., at which server 110(a)-110(N), region folder 204(a)-204(N), and bucket folder 206(a)-206(N) the newly created metadata file is stored. The director 520 receives the data from the queue 510, and stores the data received from the queue 510.

The director 520 transmits (524) data to the queue 510 that identifies the organizer 530. For example, the director 520 can receive information identifying a data store, a particular region, and a bucket, and in response to receiving the information, can transmit data to the queue 510 that identifies the organizer 530. In some instances, the organizer 530 is an organizer 530 that is specific to the particular store, region, and/or bucket identified by the queue 510. In some implementations, the information transmitted to the queue 510 by the director 520 can include data that identifies the changes that the organizer 530 has notified the director 520 of, e.g., such that the data transmitted by the director 520 to the queue 510 indicates that the queue flush data included in one or more metadata files has been compacted into a newly created metadata file.

Figure 6:
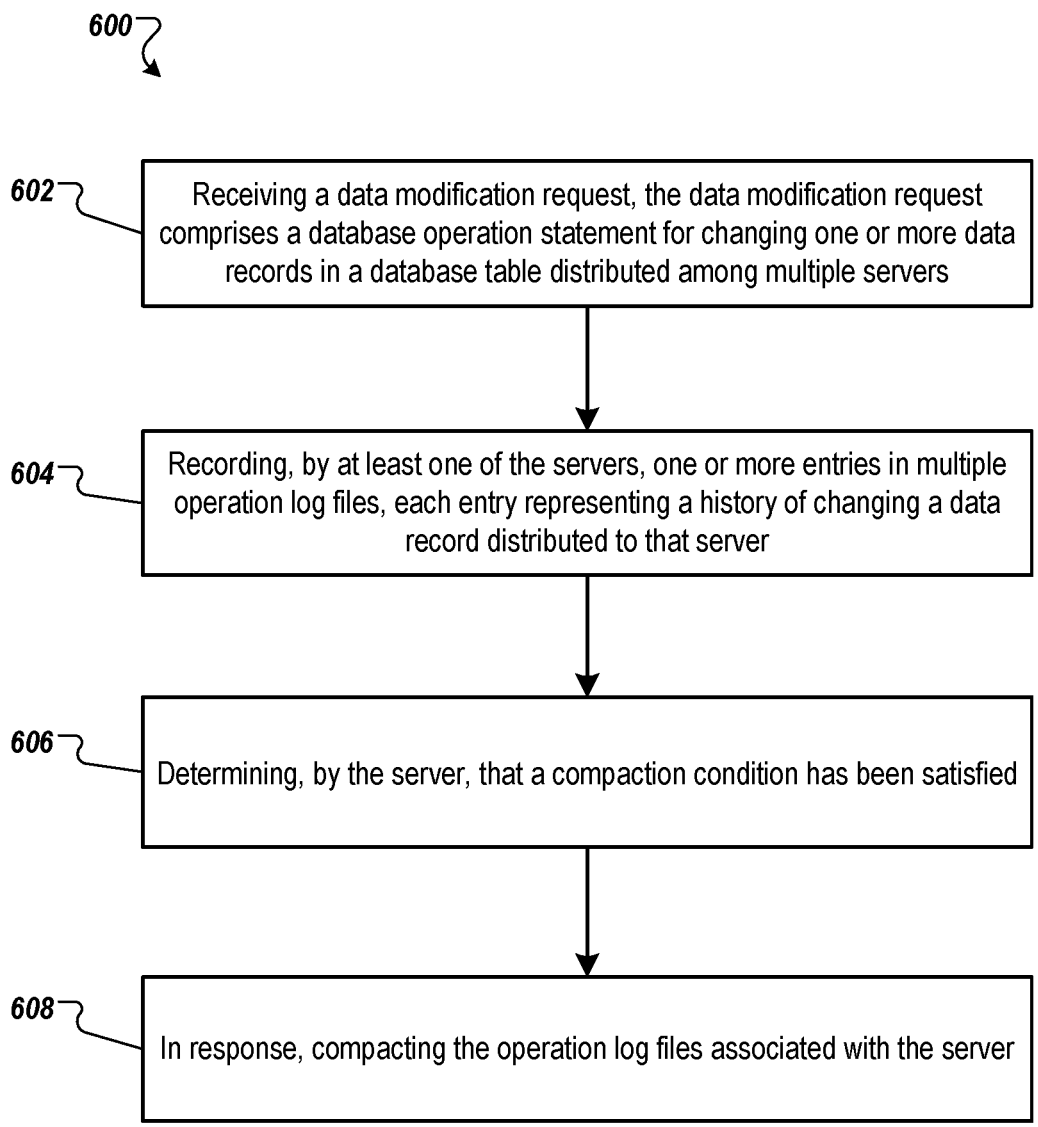
FIG. 6 is a flowchart of an example process of compacting data history files.

FIG. 6 is a flowchart of example process 600 of compacting data history files. Process 600 can be performed by a parallel processing database system including multiple computers.

The system receives (602) a data modification request. The data modification request includes a database operation statement for changing one or more data records in a database table distributed among multiple servers of the system. Each server includes a computer program executing on one or more of the computers. For example, each server can be a JVM. The database operation statement can be a Structured Query Language (SQL) statement for inserting, deleting, updating data records in the database table, or for adding, deleting, truncating, or modifying columns of the database table. Each column can correspond to a data field of the data records.

At least one of the servers of the system records (604) one or more entries in multiple operation log files. Each entry represents a history of changing a data record distributed to that server. The operation log files are stored on a storage device associated with that server;

The server determines (606) that a compaction condition has been satisfied. The compaction condition can include a file size condition specifying that the server compacts the operation log files upon determining that a total size of the operation log files or that a size of each of the operation log files satisfies a size condition. The compaction condition can include a file count condition specifying that that the server compacts operation log files when the number of operation log files reaches a threshold number. The compaction condition can include a time condition specifying that the server compacts the operation log files upon determining that a threshold time since a last compaction has passed.

In response, the server compacts (608) the operation log files associated with the server. Compacting the operation log files includes merging at least two of the operation log files to form one merged operation log file. The merged operation log file includes fewer entries than the number of entries in the operation log files being merged. The number of entries discarded by the compaction process, that is, the difference between the number of entries in the merged operation log file and a sum of numbers of entries in the at least two operation log files being merged, is determined based on a compaction setting.

The compaction setting can specify that the operation log files are compacted in a minor compaction mode. In the minor compaction mode, the server merges eligible operation log files based on a minimum file size setting, a maximum file size setting, or a total file size setting. A number of entries to be discarded during merging is determined based at least in part on the minimum file size setting, the maximum file size setting, or the total file size setting. For example, if the minimum compaction setting specifies a total file size, existing operation log files may be compacted and entries in the log files discarded until the total file size is satisfied. The server then deletes the eligible operation log after the merging after a period of time specified by a user setting.

The compaction setting can specify that the operation log files are compacted in a major compaction mode. In the major compaction mode, the server combines data record values in a logical bucket of the server into a persistence file. The server preserves a latest value of each data record in the persistence file. The server discards historical values of each data record.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by one or more computers, the method comprising:

obtaining one or more metadata files, wherein each metadata file is a log file comprising one or more entries that each individually represent a history of changes to a respective data record stored on a particular server of a plurality of servers;

determining, by the one or more computers, that a minor compaction condition has been satisfied;

in response to determining that the minor compaction condition has been satisfied, performing a minor compaction process to create one or more intermediate metadata files that each include at least compacted contents of one or more of the metadata files, including:
      merging at least two metadata files by (i) including, in each of the one or more intermediate metadata files, one or more entries from the at least two metadata files, and (ii) discarding one or more other entries from the at least two metadata files;

determining, by the one or more computers, that a major compaction condition has been satisfied; and in response to determining that the major compaction condition has been satisfied, performing a major compaction process to create one or more snapshot metadata files that each include at least compacted contents of one or more of the intermediate metadata files, including:
      merging at least two intermediate metadata files generated by one or more respective minor compaction processes by (i) including, in each of the one or more snapshot metadata files, one or more entries from the at least two intermediate metadata files, and (ii) discarding one or more other entries from the at least two intermediate metadata files.

2. The method of claim 1, wherein the one or more metadata files are generated as a result of flushing a queue of requests to perform operations on data.

3. The method of claim 2, wherein the requests include requests to query data, requests to update data, requests to synchronize data with a data repository, or requests to remove data.

4. The method of claim 2, wherein the data comprises one or more data records in a database table, wherein the data records are stored on multiple servers, each server including a computer program executing on one or more of the one or more computers.

5. The method of claim 1, wherein the one or more metadata files include data identifying one or more rows or key-value pairs, and wherein the one or more intermediate metadata files that each include at least compacted contents of one or more of the metadata files include data representing a history of one or more of the row or key-value pairs.

6. The method of claim 1, wherein the one or more snapshot metadata files include data identifying a latest value associated with a key-value pair.

7. The method of claim 1, wherein the minor compaction condition specifies a frequency of performing minor compaction of metadata files; and
   wherein the major compaction condition specifies a frequency of performing major compaction of metadata files.

8. The method of claim 1, wherein at least one of the minor compaction condition or the major compaction condition specifies an individual maximum metadata file size, an individual minimum metadata file size, or a cumulative size of the one or more metadata files.

9. The method of claim 8, wherein the one or more metadata files comprise entries that each correspond to a request to perform an operation on data; and wherein creating the one or more intermediate metadata files or the one or more snapshot metadata files comprises discarding a number of entries determined based at least on the individual maximum metadata file size, the individual minimum metadata file size, or the cumulative size of the one or more metadata files.

10. The method of claim 1, comprising:
marking the one or more metadata files for deletion in accordance with a specified deletion setting; and
deleting the one or more metadata files in accordance with the deletion setting.

11. One or more non-transitory computer storage media encoded with computer program instructions that when executed by one or more computers cause the one or more computers to perform operations comprising:
obtaining one or more metadata files, wherein each metadata file is a log file comprising one or more entries that each individually represent a history of changes to a respective data record;
determining, by the one or more computers, that a minor compaction condition has been satisfied;
in response to determining that a minor compaction condition has been satisfied, performing a minor compaction process to create one or more intermediate metadata files that each include at least compacted contents of one or more of the metadata files, including:
merging at least two metadata files by (i) including, in each of the one or more intermediate metadata files, one or more entries from the at least two metadata files, and (ii) discarding one or more other entries from the at least two metadata files;
determining, by the one or more computers, that a major compaction condition has been satisfied; and
in response to determining that the major compaction condition has been satisfied, performing a major compaction process to create one or more snapshot metadata files that each include at least compacted contents of one or more of the intermediate metadata files, including:
merging at least two intermediate metadata files generated by one or more respective minor compaction processes by (i) including, in each of the one or more snapshot metadata files, one or more entries from the at least two intermediate metadata files, and (ii) discarding one or more other entries from the at least two intermediate metadata files.

12. The one or more computer storage media of claim 11, wherein the one or more metadata files are generated as a result of flushing a queue of requests to perform operations on data.

13. The one or more computer storage media of claim 12, wherein the requests include requests to query data, requests to update data, requests to synchronize data with a data repository, or requests to remove data.

14. The one or more computer storage media of claim 12, wherein the data comprises one or more data records in a database table, wherein the data records are stored on multiple servers, each server including a computer program executing on one or more of the one or more computers.

15. The one or more computer storage media of claim 11, wherein the one or more metadata files include data identifying one or more rows or key-value pairs, and wherein the one or more intermediate metadata files that each include at least compacted contents of one or more of the metadata files include data representing a history of one or more of the row or key-value pairs.

16. The one or more computer storage media of claim 11, wherein the one or more snapshot metadata files include data identifying a latest value associated with a key-value pair.

17. The one or more computer storage media of claim 11, wherein the minor compaction condition specifies a frequency of performing minor compaction of metadata files; and
wherein the major compaction condition specifies a frequency of performing major compaction of metadata files.

18. The one or more computer storage media of claim 11, wherein at least one of the minor compaction condition or the major compaction condition specifies an individual maximum metadata file size, an individual minimum metadata file size, or a cumulative size of the one or more metadata files.

19. A system comprising:
one or more computers and one or more storage devices storing instructions that are operable, when executed by the one or more computers, to cause the one or more computers to perform operations comprising:
obtaining one or more metadata files, wherein each metadata file is a log file comprising one or more entries that each individually represent a history of changes to a respective data record;
determining, by one or more computers, that a minor compaction condition has been satisfied;
in response to determining that a minor compaction condition has been satisfied, performing a minor compaction process to create one or more intermediate metadata files that each include at least compacted contents of one or more of the metadata files, including:
merging at least two metadata files by (i) including, in each of the one or more intermediate metadata files, one or more entries from the at least two metadata files, and (ii) discarding one or more other entries from the at least two metadata files;
determining, by one or more computers, that a major compaction condition has been satisfied; and
in response to determining that the major compaction condition has been satisfied, performing a major compaction process to create one or more snapshot metadata files that each include at least compacted contents of one or more of the intermediate metadata files, including:
merging at least two intermediate metadata files generated by one or more respective minor compaction processes by (i) including, in each of the one or more snapshot metadata files, one or more entries from the at least two intermediate metadata files, and (ii) discarding one or more other entries from the at least two intermediate metadata files.

20. The system of claim 19, wherein the one or more metadata files are generated as a result of flushing a queue of requests to perform operations on data.

21. The system of claim 20, wherein the requests include requests to query data, requests to update data, requests to synchronize data with a data repository, or requests to remove data.

22. The system of claim 20, wherein the data comprises one or more data records in a database table, wherein the data records are stored on multiple servers, each server including a computer program executing on one or more of the one or more computers.

23. The system of claim 19, wherein the one or more metadata files include data identifying one or more rows or key-value pairs, and wherein the one or more intermediate metadata files that each include at least compacted contents of one or more of the metadata files include data representing a history of one or more of the row or key-value pairs.

24. The system of claim 19, wherein the one or more snapshot metadata files include data identifying a latest value associated with a key-value pair.

25. The system of claim 19, wherein the minor compaction condition specifies a frequency of performing minor compaction of metadata files; and wherein the major compaction condition specifies a frequency of performing major compaction of metadata files.

26. The system of claim 19, wherein at least one of the minor compaction condition or the major compaction condition specifies an individual maximum metadata file size, an individual minimum metadata file size, or a cumulative size of the one or more metadata files.

* * * * *